United States Patent [19]

Garrett et al.

[11] 4,346,186

[45] Aug. 24, 1982

[54] PROCESS FOR FIXING PHOTO-INDUCED COLORED DERIVATIVES OF SPIROPYRANS AND COMPOSITIONS THEREFOR

[75] Inventors: Thomas B. Garrett, Warwick Township, Lancaster County; John E. Herweh; Alan B. Magnusson, both of East Hempfield Township, Lancaster County; Normal L. Miller, Manheim Township, Lancaster County, all of Pa.

[73] Assignee: Armstrong World Industries, Inc., Lancaster, Pa.

[21] Appl. No.: 305,455

[22] Filed: Sep. 25, 1981

Related U.S. Application Data

[63] Continuation-in-part of Ser. No. 189,031, Sep. 22, 1980, abandoned.

[51] Int. Cl.$^3$ ............................................. C08K 5/00

[52] U.S. Cl. ...................................... 524/82; 524/84; 524/88; 524/104; 524/110; 524/111

[58] Field of Search ............... 260/42.21, 42.49, 42.52; 204/158 R, 159.14; 430/337, 345; 252/600

[56] References Cited

U.S. PATENT DOCUMENTS

| | | | |
|---|---|---|---|
| 3,501,410 | 11/1970 | Newland et al. | 260/42.21 |
| 3,810,762 | 5/1974 | Laridon et al. | 430/337 |
| 4,026,705 | 5/1977 | Crivello | 204/159.18 |
| 4,173,551 | 11/1979 | Crivello | 260/18 EP |

FOREIGN PATENT DOCUMENTS

| | | | |
|---|---|---|---|
| 48-29062 | 6/1973 | Japan | 430/345 |

*Primary Examiner*—Lewis T. Jacobs

[57] ABSTRACT

The present invention relates to processes for fixing photo-induced colored derivatives of spiropryans in solvent and solid solutions, and to compositions in which said photo-induced colored derivatives may be fixed, said processes comprising irradiating solvent or solid solutions comprising a spiropryan and an iodonium salt.

22 Claims, No Drawings

PROCESS FOR FIXING PHOTO-INDUCED COLORED DERIVATIVES OF SPIROPYRANS AND COMPOSITIONS THEREFOR

This application is a continuation-in-part of our co-pending application Ser. No. 189,031, filed Sept. 22, 1980, now abandoned.

This invention relates to spiropyrans capable of producing colored derivatives upon irradiation.

More specifically, this invention pertains to a method for fixing photoinduced colored derivatives of spiropyrans using iodonium salts as fixatives, and to compositions therefor.

BACKGROUND OF THE INVENTION

Certain spiropyrans are known to exhibit photochromic properties; that is, they undergo reversible, light-induced photochemical processes that result in a color change. The process attributed to the photochromism of spiropyrans is generalized by the following equation (1):

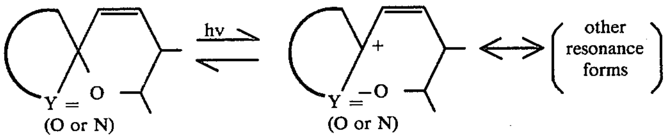

(1)

when the reversibility indicated in equation (1) is disrupted by chemical reaction, the phenomenon of photochromism no longer operates and the spiropyran is fixed in its colored form. The ability to fix the colored form of photochromic spiropyrans has led to their use in, for example, optical data storage. (See S. Maslowski, "High Density Data Storage UV Sensitive Tape", Applied Optics, 13, No. 4, 857 (1974).

Several chemical methods for fixing spiropyrans in their colored form are known. See, for example, G. Brown, "Photochromism, Techniques of Chemistry Vol. III", Wiley-Interscience 1971 (New York), p 268. One well known method involves the use of a hydrogen halide, HX, which is generated by light within a polymeric substrate containing the spiropyran. Precursors for HX include organic compounds containing bromine, which compounds absorb light and generate hydrogen bromide which reacts with the spiropyran to give a colored salt as generalized in equation (2):

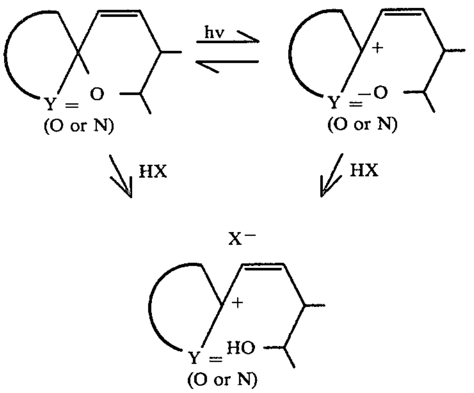

(2)

The system of equation (2) has several inherent disadvantages: the HX precursors, e.g., 2,2,2-tribromoethanol, are unstable to sunlight and moisture; also, the HX acid formed is volatile and the photoinduced formation of the HX acid is not necessarily rapid or complete, i.e., the reaction can continue after irradiation is terminated. The present invention helps to solve these problems by providing a novel process for fixing spiropryans in their colored form.

SUMMARY OF THE INVENTION

The present invention relates to processes for fixing photo-induced colored derivatives of spiropryans in solvent and solid solutions, and to compositions in which said photo-induced colored derivatives may be fixed, said processes comprising irradiating solvent or solid solutions comprising a spiropryan and an iodonium salt.

DETAILED DESCRIPTION OF PREFERRED EMBODIMENTS

According to one embodiment of this invention, there is provided a process for fixing spiropyrans in their colored form, said process comprising the steps of preparing a solvent solution comprising (a) a spiropyran having the formula

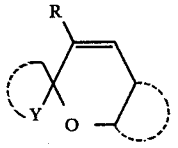

wherein Y represents NR, O or S and each R independently represents H, alkyl or alkenyl and (b) an iodonium salt, said solvent solution comprising from about 0.1 to about 10 moles of iodonium salt for every one mole of spiropyran; and irradiating said solvent solution with a sufficient dose of ultraviolet radiation to fix said spiropyran in its colored form.

In a second embodiment there is provided a process for fixing spiropyrans in their colored form, said process comprising the steps of preparing a solvent solution comprising (a) a spiropyran having the formula

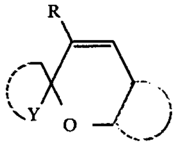

wherein Y represents NR, O or S and each R independently represents H, alkyl or alkenyl, (b) an iodonium salt, said solvent solution comprising from about 0.1 to about 10 moles of iodonium salt for every one mole of spiropyran, the (c) a polymer, said polymer containing no basic nitrogen atoms; removing the solvent from said solvent solution to give a solid solution; and irradiating said solid solution with a sufficient dose of ultraviolet radiation to fix said spiropyran in its colored form.

In a third embodiment there is provided a composition comprising a spiropyran capable of being fixed in its colored form, said composition comprising (a) a solvent, (b) a spiropyan having the formula

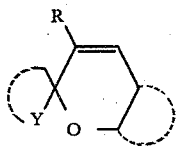

wherein Y represents NR, O or S and each R independently represents H, alkyl or alkenyl, and (c) an iodonium salt, said iodonium salt being present in from about 0.1 to about 10 moles for every one mole of spiropyran, whereby said spiropyran may be fixed in its colored form by exposure to a sufficient dose of ultraviolet radiation.

In a fourth embodiment there is provided a composition comprising a solid solution of a spiropyran capable of being fixed in its colored form, said composition comprising (a) a spiropyran having the formula

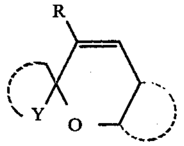

wherein Y represents NR, O or S and each R independently represents H, alkyl or alkenyl, (b) an iodonium salt, said iodonium salt being present in from about 0.1 to about 10 moles for every one mole of spiropyran, and (c) a polymer containing no basic nitrogen atoms, whereby said spiropyran may be fixed in its colored form by exposure to a sufficient dose of ultraviolet radiation.

As used herein, "fixative" is understood to mean a compound which by itself or by reaction serves to stabilize the color of a spiropyran contained in a solid solution or a solvent solution toward the action of visible light.

In its preferred form, the colored solid solution of this invention will be in film form and may or may not be in contact with a substrate.

The solid or solvent solutions of the present invention will contain from about 0.1 to about 10 moles of iodonium salt for every 1 mole of spiropyran. Best results are usually obtained when from about 0.5 to about 2 moles of iodonium salt are employed per 1 mole of spiropyran.

Representative classes of spiropyrans which have the above formula and are suitable for use in the practice of this invention include those of the spiro[2H-1-benzopyran-2,2'-indoline] class, the spiro[2H-1-benzopyran-2,2'-benzothiazoline] class and the 2,2'-spirobi[2H-1-benzopyran] class. Specific examples suitable for use include: 8-ethoxy-1',3',3'-trimethylspiro[2H-1-benzopyran-2,2'-indoline]; 1,3,3-trimethylspiro[indoline-2,3'-[3H]-naphtho[2,1-b]pyran]; and, 2-methyl-3,3'-spirobi[3H-naphtho[2,1-b]pyran ].

In the practice of this invention, as the fixative, use can be made of any suitable iodonium salt. Particularly suitable for use are the diaryliodonium salts, where the counter ion is $BF_4^-$, $PF_6^-$, $SbF_6^-$, $AsF_6^-$, etc., such as, for example, diphenyliodonium hexafluorophosphate. Other suitable diaryliodonium salts are taught in U.S. Pat. No. 4,069,055 to Crivello.

As the polymer to produce the solid solution, use can be made of any polymer which does not contain basic nitrogen atoms. Suitable polymers include polyvinyl chloride, polymethyl methacrylate, polypropyl methacrylate and the like.

As the solvent for both the solvent solution and the solid solution, use can be made of any common solvent for all components employed.

Having described the ingredients and mehods or practicing this invention, reference is now made to the following examples which are provided to illustrate but not to limit the scope of this invention.

EXAMPLE I

This example demonstrates the preparation of a solid solution in film form according to this invention. The mole ratio of iodonium salt to spiropyran was 1.1/1.0.

Into a mixing vessel containing 23.25 grams of solvent, methyl ethyl ketone, was added and dissolved, 1.75 grams of polyvinyl chloride (designated "PVC 2200," commercially available from Air Products and Chemicals. See U.S. Pat. No. 3,057,831 which teaches the process for producing PVC 2200).

Into the contents of the mixing vessel was added 0.1 gram of 8-ethoxy spiro[2H-1-benzopyran-2,2'-indoline] with stirring, followed by addition of 0.15 gram of diphenyliodonium hexafluorophosphate with continued stirring.

The contents of the mixing vessel were recovered as a colorless solution. The solution was coated on a glass plate to a thickness of 6 mils using a Bird blade. The resulting colorless film was stripped from the glass plate and further dried under vacuum for about 16 hours.

The dried film was exposed to monochromatic light at 312 nm using a band pass filter and a Hanovia medium pressure 450 W mercury lamp as the light source. The exposure time was 5 minutes and the intensity of absorbance, $A_o$, at 400 nm after irradiation was 1.34.

The resulting exposed film was observed to be yellow in color and the near UV-visible absorbance spectrum of the film was monitored during exposure to FS-40 fluorescent sunlamps through 3/32 inch thick window glass to determine its relative fading rate. The value obtained for the first-order rate constant was 0.04 $day^{-1}$ which was the average between 2 and 8 days.

EXAMPLE II

This example demonstrates the preparation of a solid solution of this invention in film form. The mole ratio of iodonium salt to spiropyran was 2.2/1.0.

Methyl methacrylate was distilled under vacuum to remove inhibitor and was then bulk polymerized under a helium atmosphere in a sealed tube using 2,2'-azobis(2-methylpropionitrile) as the initiator. Polymerization was achieved by heating at about 70° C. for about 4 hours. The resulting polymethyl methacrylate was recovered and used as follows.

Into a mixing vessel containing 12.5 grams of an 8% by weight polymethyl methacrylate in 1,2-dichloroethane solution were added 0.03 gram of diphenyliodonium hexafluorophosphate and 0.025 gram of 3-methyl-7-methoxy-2,2′-spirobi[2H-1-benzopyran] at room temperature with stirring.

The contents of the mixing vessel were recovered as a colorless solution. The solution was coated on a glass plate to a thickness of 6 mils using a Bird blade and air dried. The resulting colorless film was stripped from the glass plate and further dried under vacuum for about 16 hours. The film was observed, after drying to be a pale pink color.

The dried film was exposed to the radiation of two Sylvania F15T8-BLB fluorescent lights for about 10 minutes which exposure turned the film red.

EXAMPLE III

This example illustrates that inclusion of an iodonium salt in a polymer film containing a spiropyran produces a more stable colored species upon ultraviolet irradiation than does a film containing no iodonium salt.

A solution was prepared according to the present invention by dissolving in 10 grams of an 8% by weight solution of polymethyl methacrylate in 1,2-dichloroethane, 0.20 gram of 6-nitro-1′,3′,3′-trimethylspiro[2H-1-benzopyran-2,2′-indoline] and 0.26 gram of diphenyliodonium hexafluorophosphate. A control solution was similarly prepared by dissolving in 10 grams of an 8% by weight solution of polymethyl methacrylate in 1,2-dichloroethane 0.20 gram of 6-nitro-1′,3′,3′-trimethylspiro[2H-1-benzopyran-2,2′-indoline].

The solutions were separately coated onto glass plates to thicknesses of 6 mils using a Bird blade and allowed to air dry. The resulting colorless films were stripped from the glass plates and further dried under vacuum.

A sample was cut from each film, and each sample was exposed for one minute at a distance of 7.5 cm to the unfiltered radiation from a 450 W medium pressure mercury arc (Hanovia Lamp Division, Engelhard Industries). The film sample prepared according to the present invention was found to be colored yellow whereas the control sample was a deep lavender.

The two films were next placed side-by-side under a 40 W clear tungsten lamp at a distance of 10 cm, and half of each film was masked to exclude the light. After one hour of exposure the color in the exposed half of the control film was destroyed, whereas that in the exposed half of the film prepared according to the present invention was found to have faded only slightly upon comparison with the masked portion of that film.

EXAMPLE IV

This example illustrates the advantage in terms of coloration rate of using as a fixative an iodonium salt in place of a polyhalogenated organic compound in a spiropyran-containing polymer film.

A solution was prepared according to the present invention by dissolving in 10 grams of an 8% by weight solution of polymethyl methacrylate in 1,2-dichloroethane 0.05 gram of 7-dimethylamino-3-methyl-2,2′-spirobi[2H-1-benzopyran] and 0.08 gram of diphenyliodonium hexafluorophosphate. A control solution was also prepared by dissolving in 10 grams of an 8% by weight solution of polymethyl methacrylate in 1,2-dichloroethane 0.05 gram of 7-dimethylamino-3-methyl-2,2′-spirobi[2H-1-benzopyran] and 0.05 gram of 2,2,2-tribromoethanol. In the solution prepared according to the present invention the mole ratio of iodonium salt to spiropyran is 1.1 to 1 and, similarly, in the control solution the mole ratio of tribromoethanol to spiropyran is 1.1 to 1.

The solutions were separately coated onto glass plates to thicknesses of 6 mils using a Bird blade and allowed to air dry. The resulting films were stripped from the glass plates and further dried under vacuum. The thickness of each film was 25 microns (1 mil).

A sample was cut from each film and these were exposed for various time intervals to ultraviolet radiation from a pair of F15T8-BLB lamps (Sylvania Electric Company). After every period of exposure, the absorbance spectrum of each film was recorded. The accompanying table lists the values of the optical absorbance at a wavelength of 580 nm as a function of cumulative exposure time. It is evident from these data that the color intensity increased more rapidly with ultraviolet exposure in the film containing the iodonium salt.

Change in Absorbance at 580 nm with Time

| Cumulative Exposure Time (min) | Absorbance for samples containing indicated additive: Diphenyliodonium hexafluorophosphate | 2,2,2-tribromoethanol |
|---|---|---|
| 1 | 0.32 | 0.11 |
| 5 | 0.72 | 0.14 |
| 10 | 1.13 | 0.21 |
| 20 | 1.76 | 0.34 |
| 40 | 2.55 | 0.65 |

EXAMPLE V

This example illustrates the preparation of a colored solvent solution according to the present invention.

To 10 ml of a solvent, ethyl acetate, were added 0.06 gram of diphenyliodonium hexafluorophosphate and 0.03 gram of 3-methyl-7-methoxy-2,2′-spirobi[2H-1-benzopyran-2,3′-(3H)-naphtho(2,1-b)pyran]. Once the solid materials were completely dissolved in the solvent, some of the resulting clear, colorless solution was placed in a quartz cuvette and exposed for 20 minutes to the radiation from a pair of F15T8-BLB fluorescent lamps (Sylvania Electric Co.). The still clear solution was converted to a deep purple in color.

EXAMPLE VI

This example illustrates the preparation of a colored solvent solution and a colored polymer film according to the present invention.

To 10 ml of an ethyl acetate solution containing 8% by weight of polymethyl methacrylate were added 0.06 gram of diphenyliodonium hexafluorophosphate and 0.03 gram of 3-methyl-7-methoxy-2,2′-spirobi[2H-1-benzopyran-2,3′-(3H)-naphtho(2,1-b)pyran] and the mixture was stirred to dissolve the solid materials. Some of the resulting clear, colorless solution was placed in a quartz cuvette and exposed for 40 minutes to the radiation from a pair of F15T8-BLB fluorescent lamps (Sylvania Electric Co.). The resulting clear intensely colored purple solution was poured under subdued lighting onto a glass plate and drawn down to a wet thickness of 6 mils with a Bird blade. The light purple-colored wet coating was allowed to dry in darkness and produced a light purple-colored film.

It will be evident from the foregoing that various modifications can be made to this invention. Such, however, are considered as being within the scope of this invention.

What is claimed is:

1. A process for fixing spiropyrans in their colored form, said process comprising the steps of:

preparing a solvent solution comprising (a) a spiropyran having the formula

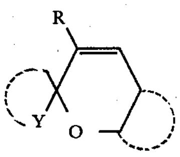

wherein Y represents NR, O or S and each R independently represents H, alkyl or alkenyl, and (b) an iodonium salt, said solvent solution comprising from about 0.1 to about 10 moles of iodonium salt for every one mole of spiropyran, and irradiating said solvent solution with a sufficient dose of ultraviolet radiation to fix said spiropyran in its colored form.

2. The invention as set forth in claim 1 hereof wherein said solvent solution comprises from about 0.5 to about 2 moles of iodonium salt for every one mole of spiropyran.

3. The invention as set forth in claims 1 or 2 hereof wherein said solvent solution comprises a polymer, said polymer containing no basic nitrogen atoms.

4. The invention as set forth in claim 3 hereof wherein said polymer is polyvinyl chloride.

5. The invention as set forth in claim 3 hereof wherein said polymer is polymethyl methacrylate.

6. The invention as set forth in claim 3 hereof wherein said polymer is polypropyl methacrylate.

7. A process for fixing spiropyrans in their colored form, said process comprising the steps of:

preparing a solvent solution comprising (a) a spiropyran having the formula

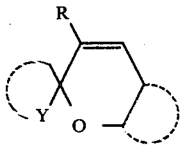

wherein Y represents NR, O or S and each R independently represents H, alkyl or alkenyl, (b) an iodonium salt, said solvent solution comprising from about 0.1 to about 10 moles of iodonium salt for every one mole of spiropyran, and (c) a polymer, said polymer containing no basic nitrogen atoms, removing the solvent from said solvent solution to give a solid solution, and irradiating said solid solution with a sufficient dose of ultraviolet radiation to fix said spiropyran in its colored form.

8. The invention as set forth in claim 7 hereof wherein said solvent solution comprises from about 0.5 to about 2 moles of iodonium salt for every one mole of spiropyran.

9. The invention as set forth in claims 7 or 8 hereof wherein said polymer is polyvinyl chloride.

10. The invention as set forth in claims 7 or 8 hereof wherein said polymer is polymethyl methacrylate.

11. The invention as set forth in claims 7 or 8 hereof wherein said polymer is polypropyl methacrylate.

12. A composition comprising a spiropyran capable of being fixed in its colored form, said composition comprising (a) a solvent, (b) a spiropyran having the formula

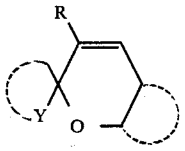

wherein Y represents NR, O or S and each R independently represents H, alkyl or alkenyl, and (c) an iodonium salt, said iodonium salt being present in from about 0.1 to about 10 moles for every one mole of spiropyran, whereby said spiropyran may be fixed in its colored form by exposure to a sufficient dose of ultraviolet radiation.

13. A composition as set forth in claim 12 hereof comprising from about 0.5 to about 2 moles of iodonium salt for every one mole of spiropyran.

14. A composition as set forth in claims 12 or 13 hereof, said composition comprising a polymer containing no basic nitrogen atoms.

15. A composition as set forth in claim 14 hereof wherein said polymer is polyvinyl chloride.

16. A composition as set forth in claim 14 hereof wherein said polymer is polymethyl methacrylate.

17. A composition as set forth in claim 14 hereof wherein said polymer is polypropyl methacrylate.

18. A composition comprising a solid solution of a spiropyran capable of being fixed in its colored form, said composition comprising (a) a spiropyran having the formula

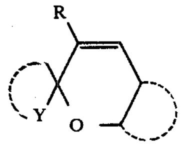

wherein Y represents NR, O or S and each R independently represents H, alkyl or alkenyl, (b) an iodonium salt, said iodonium salt being present in from about 0.1 to about 10 moles for every one mole of spiropyran, and (c) a polymer containing no basic nitrogen atoms, whereby said spiropyran may be fixed in its colored form by exposure to a sufficient dose of ultraviolet radiation.

19. A composition as set forth in claim 18 hereof comprising from about 0.5 to about 2 moles of iodonium salt for every one mole of spiropyran.

20. A composition as set forth in claims 18 or 19 hereof wherein said polymer is polyvinyl chloride.

21. A composition as set forth in claims 18 or 19 hereof wherein said polymer is polymethyl methacrylate.

22. A composition as set forth in claims 18 or 19 hereof wherein said polymer is polypropyl methacrylate.

* * * * *